United States Patent Office 2,741,116
Patented Apr. 10, 1956

2,741,116

CONCENTRATED HERBICIDE COMPOSITIONS

James H. Fookes, Hope, Mich., assignor to The Dow Chemical Company, Midland, Mich., a corporation of Delaware No Drawing. Application March 18, 1954,
Serial No. 417,220

2 Claims. (Cl. 71—2.6)

The present invention is concerned with herbicides and is particularly directed to concentrated herbicide compositions including as active ingredients the normalbutyl and isobutyl esters of 2,4,5-trichlorophenoxy-acetic acid.

In recent years, the alkyl esters of 2,4,5-trichlorophenoxy-acetic acid (hereinafter referred to as 2,4,5-T) have been widely employed as active constituents of growth control compositions for the suppression of the growth and killing of weeds and undesirable brush. In such use, the esters are generally employed in the form of a petroleum distillate or organic solvent solution, or aqueous dispersion or emulsion. Such compositions are usually prepared from a concentrated herbicide composition or concentrate composition containing an alkyl ester of 2,4,5-T together with one or a plurality of additaments including organic solvents, petroleum distillates, and dispersing and emulsifying agents. Such concentrates are articles of commerce ordinarily available in the form of viscous liquids.

The distribution and use of many of the commercially available concentrate formulations have constituted a very serious problem to the manufacture and ultimate user due to the fact that they tend to solidify or freeze at temperatures well above the freezing point of water. Such temperatures are commonly encountered in transit and storage, since the valuable ester-type concentrates are preferably supplied the distributor during the winter months prior to the growing season. Frequently the concentrates may become completely solid during the transportation and storage interval. The freezing and subsequent thawing oftentimes causes stratification of the concentrates as well as the precipitation of solid materials upon the interior surfaces of containers. Such formulations must be brought to the liquid state through the application of heat and thereafter thoroughly agitated in order to return their homogeneity. As a result, concentrated herbicide compositions, which have a tendency to freeze at commonly encountered winter temperatures, have been considered undesirable.

Some manufacturers have attempted to overcome the freezing problem in 2,4,5-T alkyl ester formulations by means of anti-freeze or coupling agents such as ethanol or higher alcohols. Other formulators have tried to improve the freezing properties through the use of aromatic solvents such as toluene. However, such practices have not been entirely satisfactory due to the fact that more desirable freezing properties are only obtained through the use of large amounts of alcohol or aromatic solvent. The alcohol or solvent thus acts as a diluent so that concentrate formulations contain undesirably low proportions of the alkyl ester of 2,4,5-T. Further, the use of such diluents increase formulation as well as transportation costs of the concentrate materials.

It is an object of the present invention to provide concentrated herbicide compositions which have very desirable freezing properties and include alkyl esters of 2,4,5-T as active ingredients. Another object is the production of liquid herbicide compositions which contain a high concentration of alkyl esters of 2,4,5-T as active ingredients and are not subject to solidification or freezing at temperatures commonly encountered in transit and storage. A further object is the provision of 2,4,5-T alkyl ester concentrates which are highly resistant to solidification and freezing at temperatures commonly encountered in transit and storage and by means otherwise than the employment of relatively inactive diluents.

Another object is to provide concentrated herbicide compositions which have the aforementioned desirable properties when formulated with relatively cheap oils such as the petroleum hydrocarbon distillates, e. g. Stoddard solvent, fuel oil, kerosene, and naphtha. Other objects will become apparent from the following specification and claims.

According to the present invention, it has been discovered that concentrated herbicide compositions comprising as a major active ingredient a mixture of the normalbutyl and isobutyl esters of 2,4,5-T have very desirable freezing properties. More particularly, it has been discovered that concentrated herbicide compositions in which the active material comprises a mixture of from 30 to 70 percent by weight of the normalbutyl ester of 2,4,5-T in from 70 to 30 percent by weight of the isobutyl ester of 2,4,5-T exhibit unusually high resistance to solidification or freezing at temperatures commonly encountered in transit and storage during the winter months. This desirable property also characterizes compositions consisting only of the normalbutyl and isobutyl esters of 2,4,5-T in the stated proportions. Many such compositions do not freeze when subjected for a period of several days to temperatures as low as from 0° to 10° C. Further, after freezing, the compositions readily return to the liquid state, or thaw with little loss of homogeneity. The ability to resist freezing at temperatures considerably lower than the thaw temperature is an outstanding and advantageous characteristic of the compositions of the present invention.

Preferred compositions are those containing from 40 to 65 percent by weight of the normalbutyl esters of 2,4,5-T and from 60 to 35 percent by weight of the isobutyl ester of 2,4,5-T, said percentages being based upon the combined weight of the esters present in the compositions. Such compositions are highly resistant to freezing. Even when frozen, compositions containing only the specified esters in the preferred proportions return to the liquid state at temperatures of 15° C. or somewhat lower. This is in distinction to an actual freezing point for the individual esters of about 28.5° C. for the normalbutyl ester and of about 32° C. for the isobutyl ester.

It is a particular advantage of the present invention that concentrated herbicide compositions having even more enhanced freezing properties may be formulated from the inexpensive solvent fractions from petroleum and the stated proportions of the 2,4,5-T esters. A further advantage is that herbicide compositions containing a very high acid equivalent of the esters are not subject to solidification or freezing under the temperature conditions encountered in the winter months.

When operating in accordance with the present invention, the normalbutyl ester of 2,4,5-T is mechanically mixed with the isobutyl ester of 2,4,5-T in the proportion of from 30 to 70 parts by weight of the normalbutyl ester in from 70 to 30 parts by weight of the isobutyl ester to prepare concentrated herbicide compositions containing the desired proportions of active ingredients. Such mixing operations are carried out with ester products which are at a temperature somewhat above their melting points, i. e. with ester products in the liquid phase and under liquid conditions in the mixing vessel. Heating during the mixing operation may be employed, if desired.

In another embodiment, the normalbutyl and isobutyl esters of 2,4,5–T or a mixture of such esters, as above prepared, may be dissolved in one or more hydrocarbon oils such as (1) aromtic hydrocarbon oils, e. g. xylene, benzene, toluene and the aromatic naphthas, and (2) the petroleum hydrocarbon distillates to produce concentrate compositions having very desirable and enhanced resistance to freezing. In such compositions the esters should be employed in the aforestated critical proportions, said proportions being based upon the combined weight of the normalbutyl and isobutyl esters of 2,4,5–T present in the formulation. These oil-base compositions may contain from 35 to 95 percent by weight of the combined weight of the normalbutyl and isobutyl esters of 2,4,5–T and correspondingly from 65 to 5 percent by weight of the solvent oil. Such compositions are not subject to freezing when exposed to temperatures as low as 0° C. In many cases, the compositions do not freeze when subjected for prolonged periods to temperatures of from −5° to −15° C. or lower. The preferred oils to be employed in the compositions are the solvent fractions from petroleum including the readily available petroleum hydrocarbon distillates or base oils such as naphtha, fuel oil, Stoddard solvent, kerosene, etc. Concentrate base oil herbicide compositions comprising the mixture of esters and the inexpensive petroleum hydrocarbon distillates constitute a preferred embodiment of the present invention.

The hydrocarbon oil compositions and undiluted combinations of the normalbutyl and isobutyl esters of 2,4,5–T may be admixed or otherwise modified with emulsifying agents to prepare concentrate herbicide compositions in the form of emulsifiable liquids. The type of emulsifying and/or dispersing agent and amount thereof employed is dictated by the ability of the agent to bring about the wetting of the plant surfaces ultimately treated with the ester formulation and/or to facilitate the dispersion of the ester compounds in the dispersion medium upon dilution with a liquid carrier, such as water. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like. In such compositions, the emulsifying and dispersing agent is ordinarily employed in the amount of from about 1 to 12 percent by weight of the final composition. Concentrated herbicide compositions comprising the mixture of esters, a water immiscible organic solvent such as a petroleum distillate and an emulsifying and dispersing agent constitute a further preferred embodiment of the present invention.

When operating in accordance with the present teaching, compositions readily may be prepared which contain a very high concentration of active agent, even compositions containing as much as from 6 to 8 pounds of 2,4,5–T (acid equivalent) per U. S. gallon. Many of these highly concentrated herbicide compositions do not freeze when subjected for prolonged periods to temperatures as low as from −5° to −15° C. In many cases, the compositions after freezing, thaw at temperatures below 0° C.

The concentrate herbicide compositions as prepared in accordance with the teachings of the present invention, may be applied without modification to plants and plant parts for the suppression of vegetative growth. In a further use, the compositions may be diluted with a solvent carrier or dispersed in water, with or without the aid of a dispersng and emulsifying agent, to prepare finished plant treating compositions containing any desired amount of active ingredient.

The following examples illustrate the invention but are not to be construed as limiting the same:

EXAMPLE 1

Fifty parts by weight of the normalbutyl ester of 2,4,5–T was mixed with 50 parts of the isobutyl ester of 2,4,5–T to prepare a liquid composition of matter. The mixing operation was carried out with ester products which were in the liquid phase and under liquid conditions in the mixing vessel. This solution constitutes a herbicide concentrate characterized by a low freezing temperature.

In a further operation, the above homogeneous mixture was diluted with 50 parts by weight of the secondarybutyl ester of 2,4,5–T to prepare a second concentrate herbicide composition containing 8.7 pounds 2,4,5–T (acid equivalent) per U. S. gallon. For the latter dilution, the secondarybutyl ester product was employed in the liquid phase. Following the dilution, the resulting homogeneous mixture was cooled with agitation to −30° C. over a period of about one hour. At the latter temperature the mixture solidified and became a glass-like solid. During the cooling no crystals were observed to form in the mixed ester product. The product was then warmed to the liquid phase and seeded with crystals of the secondarybutyl ester of 2,4,5–T. Upon slowly cooling with agitation to −20° C. no crystal formation was observed in the product which appeared as a clear viscous liquid.

EXAMPLE 2

A liquid herbicide concentrate composition containing equal parts by weight of the normalbutyl, isobutyl and secondarybutyl esters of 2,4,5–T was prepared in a manner exactly comparable to that described in Example 1. A quantity of the isopropyl ester of 2,4,5–T was then warmed to the liquid phase and one mole thereof added to each mole of the previously prepared mixed ester product to produce a second herbicide concentrate containing 8.9 pounds of 2,4,5–T (acid equivalent) per U. S. gallon. The resulting homogeneous mixture was then slowly cooled to −20° C. over a period of about one hour. During the cooling no crystals were observed to form in the mixed ester product.

EXAMPLE 3

Fifty parts by weight of the normalbutyl ester of 2,4,5–T was mixed with 50 parts of the isobutyl ester of 2,4,5–T to prepare a low melting herbicide concentrate in the form of a homogeneous liquid. These operations were carried out with ester products which had been warmed to the liquid phase and under liquid conditions in the mixing vessel.

In a further operation, the above mixture was diluted with 43 parts by weight of the methyl ester of 2,4,5–T to produce a second herbicide concentrate containing 9.2 pounds 2,4,5–T (acid equivalent) per U. S. gallon. The latter operation was carried out with a methyl ester product which had been warmed to the liquid phase. Following the dilution, the resulting homogeneous mixture was slowly cooled to −20° C. at which temperature it solidified and became a glass-like solid. During the cooling no crystals were observed to form in the mixed ester product.

EXAMPLE 4

Equal molar quantities of the normalbutyl ester of 2,4,5–T and the isobutyl ester of 2,4,5–T were warmed to the liquid phase and mixed together under liquid conditions in the mixing vessel to prepare a herbicide concentrate composition containing 8.7 pounds 2,4,5–T (acid equivalent) per U. S. gallon. This homogeneous mixture was cooled in a bath comprising a slurry of acetone and solid carbon dioxide (Dry Ice) until crystal formation was observed. When the cooled ester mixture was slowly warmed, the crystals melted and the mixture became a clear liquid at 11° C.

EXAMPLE 5

A herbicide concentrate composition containing equal parts by weight of the normalbutyl, isobutyl and secondarybutyl esters of 2,4,5-T was prepared in a manner exactly comparable to that described in Example 1. Each mole of this composition was succesively diluted with one mole of the isopropyl ester of 2,4,5-T and one mole of the normalpropyl ester of 2,4,5-T to prepare a second herbicide concentrate containing 8.9 pounds 2,4,5-T (acid equivalent) per U. S. gallon. The dilution was carried out with propyl ester products which had been warmed to the liquid phase and under liquid conditions in the mixing vessel. Following the dilution, the resulting homogeneous mixture was slowly cooled to −15° C. at which temperature it crystallized. When the mixture was slowly warmed, the solid product melted and the ester mixture became a clear liquid at 0° C.

EXAMPLE 6

A herbicide concentrate composition containing equal parts by weight of the normalbutyl and isobutyl esters of 2,4,5-T was prepared in a manner exactly comparable to that described in Example 1. Each mole of this composition was successively diluted with 1.5 moles of the secondarybutyl ester of 2,4,5-T, 2.5 moles of the isopropyl ester of 2,4,5-T and 2.5 moles of the normalpropyl ester of 2,4,5-T to prepare a second herbicide concentrate containing 8.9 pounds 2,4,5-T (acid equivalent) per U. S. gallon. The dilution was carried out with propyl ester products which had been warmed to the liquid phase and under liquid conditions in the mixing vessel. Following the dilution, the resulting homogeneous mixture was slowly cooled to −5° C. at which temperature it crystallized. When the mixture was slowly warmed, the solid product melted and the mixture became a clear liquid at 0° C.

EXAMPLE 7

The following parts by weight of ingredients were mechanically mixed together to prepare herbicide concentrates in the form of emulsifiable liquids containing 4 pounds 2,4,5-T (acid equivalent) per U. S. gallon.

*Composition A*

| | |
|---|---:|
| Normalbutyl ester of 2,4,5-trichlorophenoxy-acetic acid | 45.0 |
| Isobutyl ester of 2,4,5-trichlorophenoxy-acetic acid | 45.0 |
| Secondarybutyl ester of 2,4,5-trichlorophenoxy-acetic acid | 45.0 |
| Polyethylene oxide-fatty acid ester | 13.0 |
| Highly refined petroleum sulfonate | 6.5 |
| Aromatic naphtha boiling at from 354° to 490° F. | 116.7 |

*Composition B*

| | |
|---|---:|
| Normalbutyl ester of 2,4,5-trichlorophenoxy-acetic acid | 40.7 |
| Isobutyl ester of 2,4,5-trichlorophenoxy-acetic acid | 40.7 |
| Secondarybutyl ester of 2,4,5-trichlorophenoxy-acetic acid | 40.7 |
| Polyethylene oxide-fatty acid ester | 5.2 |
| Highly refined petroleum sulfonate | 2.6 |

In such operations, the normalbutyl and isobutyl esters of 2,4,5-T were first mixed together in the liquid phase to prepare low melting herbicide concentrates. The latter homogeneous mixtures were thereafter successively diluted with the secondarybutyl ester of 2,4,5-T, the emulsifying agent and the liquid naphtha, when employed. The resulting compositions freeze at temperatures considerably below 0° C. and are particularly adapted for the preparation of aqueous herbicide spray compositions having very desirable wetting properties.

EXAMPLE 8

The normalbutyl ester of 2,4,5-T and isobutyl ester of 2,4,5-T were mechanically mixed together in the liquid phase to prepare a herbicide concentrate containing 20 percent by weight of normalbutyl ester and 80 percent of isobutyl ester. In a similar manner the esters were also mixed together to prepare another herbicide concentrate containing 40 percent by weight of normalbutyl ester and 60 percent of isobutyl ester. These concentrates contained 8.7 pounds of 2,4,5-T (acid equivalent) per U. S. gallon. Portions of the concentrates were slowly cooled with stirring to determine the temperature at which ester crystals formed in the mixtures. It was observed that crystals formed at 17° C. in the mixture containing 20 percent by weight of normalbutyl ester, while in the mixture containing 40 percent by weight of normalbutyl ester, crystal formation took place at 3° C. to 1° C.

EXAMPLE 9

The following parts by weight of ingredients were mechanically mixed together to prepare a concentrated herbicide composition in the form of an emulsifiable liquid containing 4 pounds of 2,4,5-T (acid equivalent) per U. S. gallon.

| | |
|---|---:|
| Normalbutyl ester of 2,4,5-trichlorophenoxy-acetic acid | 92.0 |
| Isobutyl ester of 2,4,5-trichlorophenoxy-acetic acid | 57.0 |
| Alkylphenol-alkylene oxide condensation product | 11.0 |
| Highly refined petroleum sulfonate | 5.5 |
| Aromatic naphtha | 110.4 |

In such operations, the normalbutyl and isobutyl esters were first mixed together in the liquid phase and the mixture thereafter successively diluted with emulsifying agent and solvent. Portions of these emulsifiable compositions were placed in cold boxes at temperatures of −10° C. and −5° C. and shortly thereafter seeded with crystals of the normalbutyl ester. After one month of storage, the portions were examined for evidence of crystal formation. The examination indicated that no crystal formation had taken place at either storage temperature.

I claim:

1. A concentrate composition comprising as an active herbicidal toxicant a mixture of the normalbutyl ester of 2,4,5-trichlorophenoxy-acetic acid and the isobutyl ester of 2,4,5-trichlorophenoxy-acetic acid, said normalbutyl ester comprising from 30 to 70 percent by weight of the combined weight of said normalbutyl and isobutyl esters present in the composition.

2. A concentrate composition as claimed in claim 1 wherein the normalbutyl ester comprises from 40 to 65 percent by weight of the combined weight of said isopropyl and normalbutyl esters present in the composition.

References Cited in the file of this patent

UNITED STATES PATENTS 2,614,919 Warren _____ Oct. 21, 1952

FOREIGN PATENTS 494,817 Canada _____ July 28, 1953